US012496551B2

(12) United States Patent
Whittaker

(10) Patent No.: US 12,496,551 B2
(45) Date of Patent: Dec. 16, 2025

(54) DIRECT AIR CAPTURE OF CARBON DIOXIDE BY INOCULATION OF TROPOSPHERIC CLOUDS WITH ALGAE

(71) Applicant: John Whittaker, Caernarfon (GB)

(72) Inventor: John Whittaker, Caernarfon (GB)

( * ) Notice: Subject to any disclaimer, the term of this patent is extended or adjusted under 35 U.S.C. 154(b) by 86 days.

(21) Appl. No.: 18/377,749

(22) Filed: Oct. 6, 2023

(65) Prior Publication Data

US 2024/0109032 A1 Apr. 4, 2024

Related U.S. Application Data

(60) Provisional application No. 63/413,050, filed on Oct. 4, 2022.

(51) Int. Cl.

| | |
|---|---|
| *B01D 53/02* | (2006.01) |
| *B01D 53/62* | (2006.01) |
| *B01D 53/84* | (2006.01) |
| *B64D 1/18* | (2006.01) |

(52) U.S. Cl.
CPC ............ *B01D 53/84* (2013.01); *B01D 53/62* (2013.01); *B64D 1/18* (2013.01); *B01D 2221/16* (2013.01); *B01D 2251/95* (2013.01); *B01D 2257/504* (2013.01); *B01D 2258/06* (2013.01)

(58) Field of Classification Search
CPC ............ B01D 2221/16; B01D 2251/95; B01D 2257/504; B01D 2258/06; B01D 53/62; B01D 53/84; B64D 1/18
See application file for complete search history.

(56) References Cited

U.S. PATENT DOCUMENTS

| | | | | |
|---|---|---|---|---|
| 6,228,136 B1 * | 5/2001 | Riley | B09C 1/10 | 435/170 |
| 2003/0044382 A1 * | 3/2003 | Selvig | A01N 63/50 | 424/93.1 |
| 2008/0236227 A1 * | 10/2008 | Flynn | C05F 11/08 | 71/7 |
| 2010/0095583 A1 * | 4/2010 | King | C12M 41/10 | 47/17 |
| 2015/0225271 A1 * | 8/2015 | Fry | C12N 13/00 | 435/294.1 |
| 2018/0216110 A1 * | 8/2018 | Sayre | A01N 25/006 | |

* cited by examiner

*Primary Examiner* — Christopher P Jones

(57) ABSTRACT

The present invention comprises the deployment of a product known as RubisCO Climate Vaccine® or simply RCV which contains a specialised adapted culture of psychrophile algae and accelerators. This RCV is inoculated into targeted tropospheric clouds. The cumulatively large air-liquid optical interface area of clouds enables conditions for potential exponential photosynthetic algal growth and replication during which carbon dioxide is processed and oxygen released directly in the troposphere. Optimal inoculation sites are determined by altitude, humidity, temperature, weather patterns and predicted direction and duration of travel for precipitation, The biomass produced in this process is intended to be precipitated over mid-ocean where it is sequestered within natural ocean food chains or sedimented as detritus essentially permanently. This nature-based solution through repeated deployments offers a feasible scalable pathway toward potential climate change reversal within a decade with minimal or no adverse environmental impact.

20 Claims, No Drawings

DIRECT AIR CAPTURE OF CARBON DIOXIDE BY INOCULATION OF TROPOSPHERIC CLOUDS WITH ALGAE

The present invention relates to climate change and provides mitigation methods with capacities to capture gigatons of carbon dioxide through its efficient, low tech and low-cost deployment. Widespread deployment not only has the potential to create a carbon neutral environment but could eventually reverse climate change to pre-industrial levels within a decade. This invention is carbon negative in both production and deployment. i.e., it entirely offsets energy costs of production, transportation, and deployment. The product itself does not produce any $CO_2$ emissions and its whole purpose is to capture $CO_2$ from the atmosphere.

Carbon dioxide ($CO_2$) is identified as a greenhouse gas that is a major contributor to the increase in global temperature. Removing high levels of the heat absorbing carbon dioxide from the atmosphere can reduce the rise in global temperature. The present invention provides product and methods that can ingest carbon dioxide from air flowing by, over, or around the product, hereinafter RubisCO Climate Vaccine® (RCV), sequester carbon within product elements, produce (self-propagate) additional functional vaccine elements, precipitate to ground or water. Following precipitation, the RCV including progeny elements integrates into the algal pathways, providing a link in the food chain and more permanent deposition of the sequestered carbon as detritus/muck.

The products and methods of this invention fix carbon (as present in $CO_2$) from the atmosphere directly in situ within the atmosphere utilizing low-cost technology and low cost energy conversion. By administering the RCV incorporating selectively cultured psychrophilic microalgal species into the troposphere extreme weather events can be reduced. The resulting algal cell growth removes high volumes of $CO_2$ directly from the atmosphere to reduce or reverse the recent rise in global temperatures. Like any inoculation it is important that the species, dose, timing, and location are predetermined for optimal planning and efficacy.

The troposphere is the lowest region of the atmosphere, extending from the earth's surface to a height of about 6-10 km (the lower boundary of the stratosphere). Photosynthesizing microorganisms within the clouds photosynthesize (convert $CO_2$ to biomass) utilizing sunlight energy fixing the $CO_2$ abundant in the troposphere into plant growth and replication. This process also releases valuable oxygen ($O_2$) back into the atmosphere. The equation for Photosynthesis $6CO_2+6H_2O \rightarrow C_6H_{12}O_6+6O_2$. $CO_2$ and water (H2O) are abundant sources available in tropospheric clouds. These reactions are believed to occur with minimal amounts of microorganisms naturally present in clouds. The present invention, by inoculating tropospheric clouds with the RCV increases this process by orders of magnitude.

The Tropospheric Algal Inoculation of Climate Vaccine of the extremophile algae directly into the clouds results in natural capture of $CO_2$ on a globally long-lasting, self-propagating widely distributed scale. The resulting algal blooms in the atmosphere are distributed across the globe by the predictable ambient weather patterns and the algal clumps form natural condensation nuclei for precipitation to Earth, thus serving to also help calm extreme weather occurrences.

A main problem facing large scale carbon capture is the land requirement and the opportunity cost of re-purposing the land mass. Costs in terms of technology and energy are tremendous. This present invention fixes carbon from the atmosphere directly within the atmosphere utilizing low-cost technology and low cost energy conversion avoiding the problematic re-purposing of land.

A cultured cocktail with species of psychrophile algae in a specialized adapted product known as RubisCO Climate Vaccine® or simply RCV is inoculated into targeted clouds to enable optimal conditions for growth and replication of the algae to capture carbon from the atmosphere. Optimal inoculation sites are determined by altitude, humidity, temperature, and predicted direction and duration of travel. Constituent microalgae of the RCV are cultured serially under conditions mimicking those present in condensation centers in the troposphere. The droplets present a high surface to volume ratio effecting a cumulatively large air-liquid interface area. The algae cultured for RCV production proliferate in the aqueous surface of ice particles within the cloud environment. As the algae grow and proliferate and continue to grow, the microorganisms require carbon atoms as building blocks in their biomolecules. In clouds seeded/inoculated with RCV, the carbon atoms are drawn from ambient $CO_2$ that is present throughout all levels in the atmosphere. $CO_2$ in the atmosphere is a significant contributor to recent global warming, climate change, and ocean acidification. Reducing atmospheric $CO_2$ towards preindustrial concentrations can diminish and reverse alterations in temperature, storm frequency and intensity, localized droughts and intense rainfall, coral bleaching and death, sea level rise, salt water infiltration, etc. Cloud inoculation with RCV of this invention is a potent means for reversing the widespread climate effects resulting from previous and current industrial activities.

A first embodiment for manufacturing the RCV features photobioreactors that are placed in industrial or other facilities that emit large amounts of $CO_2$. A second embodiment involves ice rink units that are functionally constructed for direct capture of $CO_2$ from surrounding air. The invention is a product of Rubisco Limited which has applied the name Rubisco Climate Vaccine® (RCV).

The RubisCO Climate Vaccine® (RCV) comprises a specifically optimized cocktail of extremophile psychrophile micro-organisms optimally together with a blend of constituent accelerants. The accelerants are optimally designed with the cultured cocktail for inoculation at specific locations to capture carbon dioxide directly from the atmosphere.

Post deployment, the vaccine is partially self-propagating as it consumes and removes $CO_2$ from its industrial or other facility or rink or ice field in the existing or natural environment. Pre-deployment, it can be readily stored in large containers in ambient conditions without any special requirements.

In preferred embodiments, specifically site adapted portable Carbon Dioxide Removal (CDR) units at industrial sites that are producing significant $CO_2$ emissions. The CDR units are optionally further enabled by running commercially purchased photobioreactors in which regulated $CO_2$ will boost the growth and replication of the process. Commercially available units have remote sensing, analytical and data monitoring built in. They require minimum manual intervention, e.g., on a weekly basis. Preferred units are the same size as shipping containers and therefore are easy to ship and deploy and require very little space. Such units can be sited externally or within a production facility that is producing $CO_2$. Flue gas or air is drawn into extraction units where Carbon will be removed from the $CO_2$ intake and unneeded oxygen released into the atmosphere. Many industries produce large quantities of $CO_2$ during their processes including, but not limited to: steel, plastic, fertilizer manufacturers and distilleries.

These units are primarily used to produce RubisCO Climate Vaccine® or analogous product. During vaccine production, they also operate as carbon removal facilities. Additionally, the units could be designed to produce by-products like, e.g., skin care and animal food additives. CDR units can also operate under ambient conditions. However higher levels of $CO_2$ are preferred to boost the performance.

Relatively small volumes of the RCV in a concentrated form are required for delivery to the deployment site(s). At the deployment site(s) the concentrated RCV vaccine is diluted with water, e.g., from rainwater, deionized tap water, stream flow, morning condensation, etc. for the inoculation process. Dilution rates are influenced by a number of factors, however the ratio is in the order of 8 parts per 1000, i.e. 8 ml per litre, therefore it is easy and economical to transport the vaccine for deployment. The dilution may be accomplished in flight or at the deployment outset from a ship, ground, cargo plane, etc.

The locations for the dosing, the amount and its dilution status for each inoculation is governed by threshold values and predicted levels of temperature, atmospheric pressure, humidity, diurnal light period and intensity that will enable optimized growth and replication efficacy until deposition through precipitation.

The locations for atmospheric deposition are chosen specifically to provide optimal "false Spring" conditions to result in large scale algal blooms within the clouds, which are distributed across the globe by predictable and trackable weather patterns. The algae form natural condensation nuclei for the formation of rain in which they can be ideally predicted for deposition into the oceans where the algae provide biomass into the food chains or sink to the ocean depths as detritus.

Post deployment converts gaseous $CO_2$ that can sequester the carbon as perhaps 20% enters the food chain with the remaining 80% being sequestered essentially permanently.

Whilst it is known that many microorganisms utilize carbon dioxide from the atmosphere to photosynthesize, the invention is unique in that it is a specifically designed and cultured cocktail of constituent ingredients and developmental stages of the microorganisms to enable optimized growth in the extreme atmospheric conditions for its deployed inoculation. The location for the dose, the amount, its developmental status for each inoculation is governed by threshold values of temperature, atmospheric pressure, humidity, diurnal light period and intensity and predicted patterns of environmental distribution that will enable optimized growth and replication efficacy over the period from its initial inoculation until its deposition. Whilst its growth and replication are a naturally occurring process the RCV is inoculated into new and previously microorganism uncolonized environments.

Cloud Seeding

The highest greenhouse effect in the atmosphere is water vapor according to IPC report (1992) being responsible for 55% of the greenhouse effect. Clouds themselves contribute 17% to the greenhouse effect. Although anthropogenic emissions are not usually considered as they do not accumulate in the atmosphere for long enough to have a significant impact on the global water cycle. By utilizing the cloud seeding effect of the algal inoculation to form condensation nuclei the process can be used within the clouds to reduce levels of water retained in clouds or help serve to convert water vapor into cloud cover in the atmosphere. The inventive method deploys raindrops as natural culture colony carriers for the growth and distribution of the algal cells.

The algal growth utilizes the higher available levels of soluble nitrogen and soluble reactive phosphate present in clouds to increase blooming and consequent carbon capture.

Inoculation methods vary including from extremely cheaply adapted meteorological balloons, drones, crop spraying planes and even adapted commercial airliners. The higher the concentration of $CO_2$ the greater the rate of growth and reproduction and carbon capture. The paradox of this solution is that potentially the more global air traffic, the greater the potential to reduce the amount of $CO_2$ from the air.

Optimistically, with general application of this invention on a global scale, initial conservative global modeling estimates by RubisCO Limited scientists calculated that with controlled deployment this invention has the capability of reducing $CO_2$ levels in the atmosphere to pre-industrial levels within a decade.

Cloud Conditions for "False Spring" Blooming

Blooms of algae are known to occur in snow when air temperatures can remain at or above freezing for extended periods of time. However, hard freezes may occur after snow algae make their appearance, and some species survive this environmental stress more easily than others. Three species of snow algae, *Raphidonema nivale, Chloromonas pichinchae*, and *Cylindrocystis brébissonii*, were isolated into axenic culture for optimum temperature studies under set laboratory conditions. In those temperatures tested (1, 5, 10, 15, and 20° C.), it was found that optimum growth for *R. nivale* occurred at 5° C., for *C. pichinchae* at 1° C., and for *C. brébissonii* at 10° C. Three other species of snow algae, *Chlainomonas kohli, Chlainomonas rubra*, and *Chlamydomonas nivalis* (from Washington snow), did not grow in defined medium for extended periods of time. Vegetative cells of *C. kolii* and *C. rubra* lose their flagella at temperatures above 4° C. as observed on a cooling stage, and optimum growth for these species probably occurs at a temperature below 5° C. *C. nivalis* resting spores cleave into daughter cells at temperatures from 0 to 20° C., and perhaps this observation may be used as an indicator for optimum growth in this species. (Ronald W. Rohan 24 May 2018).

Species of snow algae used in this study and in previous studies are compared with respect to their optimum temperature and temperature range for growth. Species that do not grow at temperatures above 10° C. and have optimum growth at lower temperatures are classified here as true snow algae. This list of species includes *Chlainomonas kolii, Chlainomonas rubra, Chlamydomonas nivalis* (cultures of Hoham from Washington snow), *Chloromonas pichinchae, Chloromonas sp., Raphidonema tatrae, Chromulina chionophila* (cultures of Stein), and *Cryptomonas frigoris* (Heymsfield et al).

Rain bearing Precipitating Winter Clouds have a top brightness temperature 0-5° C. defining the specific range of snow algal species suitable for cloud inoculation.

1. Water

Stratospheric water vapor mixing ratio profiles measured by the NOAA FPH during balloon ascent (blue) and controlled descent (green) over Boulder, Colorado show that water vapor levels rise to higher levels above 20,000 metres.

2. Nitrogen in Rainwater

A 2004 study of the chemical composition of rainwater at 48 sites in 31 states found nitrates in nearly all the samples, although a high degree of variation existed in both time and space. Several studies in the 1990s showed that locations along the coast of the Gulf of Mexico could expect to get 18 pounds of ammonium and nitrates per acre per year from rainwater. That's about a tenth of typical nitrogen requirements for growing crops. A study of atmospheric nitrogen in clouds by Kimberley Hill, Paul Shepson et al in 2007 showed that dissolved inorganic ions ($NH_4^+$, $Ca^{2+}$, $Mg^{2+}$, $K^+$, $H^+$, $NO_3^-$, and $SO_4^{2-}$) and organic nitrogen (DON) were measured in cloud water samples collected over the northern lower peninsula of Michigan. Within a given cloud field, several altitudes were sampled to examine changes in concentration and speciation with altitude. Several samples were analyzed for bacterial content and activity. Convective cumulus (cumulus congestus) was more concentrated than fair weather cumulus (cumulus humilis) for all major ions and DON, with the cloudy air DON concentrations in convective cumulus being twice as large as for fair weather cumulus, and for all other ions, the droplets were 4-6 times more concentrated.

The molar average distribution of nitrogen in the cloud water was 43 (±10, 1σ) % ammonium, 39 (±7)% nitrate and 18 (±11)% DON. High concentrations of bacteria were observed in the clouds with an average concentration of $2.9 \times 10^5$ (±$1.0 \times 10^5$, 1σ) bacteria $m^{-3}$ of cloudy air but which contributed less than 1% of the nitrogen in the cloud water. In addition, nitrifying bacteria were identified, indicating bacterial processing of nitrogen in the cloud water may occur. Air mass origin and altitude influence observed cloud water concentrations, except for DON. The correlations of ammonium and sulfate, and calcium and nitrate suggest that ammonium sulfate and calcium nitrate aerosol may be important sources of these ions.

Anthropogenic activities have increased the atmospheric $CO_2$ concentration and more than doubled the amount of biologically available atmospheric nitrogen through fossil fuel combustion, fertilization, biomass burning, and land clearing and conversion [Vitousek et al, 1997].

Cloud processing time course can be observed through the difference in inorganic and organic nitrogen concentrations at the base and at the top of the cloud. In general, cloud droplets increase in size and age, moving vertically through a cloud [Wallace and Hobbs, 1977]. This vertical gradient in cloud droplet age allows cloud processing to be observed over time as the droplets in the top have had the longest time to process dissolved species.

Investigations of the nitrogen budget of clouds during this study show that chemical concentrations vary greatly between cloud fields and specifically between cloud types. Cloud water concentration is inversely related to liquid water content. This increased availability of nitrogen in clouds is sufficiently high to supply more than the optimal trace requirement for snow algal growth.

SRP (Soluble Reactive Phosphate)

Research shows that algal blooms are triggered at levels of 0.08-0.1 ppm of SRP. Results of the levels of SRP in cloud water studies show levels in rainwater from 0.3 ppm and in cloud water of 0.9 ppm which are an order of 10 times greater than the trigger level required for algal blooming.

$CO_2$ Circulation:

The global overturning mass circulation called The Brewer-Dobson circulation (BDC) in which tropospheric air enters the stratosphere across the tropical tropopause, moves upward and poleward, and descends into the extratropical troposphere.

The long circuit of $CO_2$ from the extratropics to the tropics in the troposphere and then back to the extratropics in the stratosphere induces a time lag of 4-6 months such that the tropospheric and stratospheric variability are almost opposite at mid-latitudes. The result is the production of an inverted vertical $CO_2$ profile during summer. In the mid- and upper stratosphere, we found that as the tropospheric seasonal cycle is transported into the stratosphere through the tropical pipe, its amplitude is smoothed out because of the combined effect of the upwelling branch of the BDC and quasi-horizontal mixing. A more confined tropical pipe is found in the tropical band during winter and spring than during summer and autumn. (Mohamadou Diallo European Geosciences Union 2017) The levels of $CO_2$ in the atmosphere by time of year and location means that the optimal conditions for "false Spring" blooming duration and location for precipitation are predictable and controllable.

Thus nitrogen, $CO_2$, water and phosphates are sufficient to support growth following inoculation with Climate Vaccine.

Research on microalgal tolerance to high concentrations of $CO_2$ shows that microalgae are fast growing systems that can consume high quantities of $CO_2$ to produce different types of biomass. The efficiency of microalgae is highly correlated to the concentration of $CO_2$ in the atmosphere and the higher the concentration of $CO_2$ the better is the growth and hence productivity. Fadhil M Salih (*Journal of Environmental Protection*, 2011, 2, 648-654 2011).

The RCV may also be widely dispersed into clouds in a process analogous to cloud seeding. RCV elements within the clouds photosynthesize utilizing sunlight energy to convert and fix carbon dioxide directly in the troposphere into plant growth and replication. A process which also releases valuable oxygen directly back into the atmosphere. Like any inoculation it is important that the dose, timing and location are pre-determined for optimal efficacy. Resulting algal blooms in the atmosphere are distributed across the globe by the natural weather patterns. In clouds vaccine elements form natural condensation nuclei for precipitation to Earth, thus serving to also help calm extreme weather occurrences. This deployment of the RCV is again a very simple, cost-effective solution that utilizes the principles that are now well established, e.g., used those used in cloud seeding technology or applied weather balloon technology.

In a liquid form a dispersal density of approximately $5 \times 10^5$ algal organisms per liter spread at a rate of 1 liter per 25 square meters of cloud area, e.g., the area of a shadow on the ground, or simply calculated by width of dispersal, volume dispersed and speed of delivery vehicle, is adequate for the enhanced carbon capture. For example, ~40 liters of vaccine comprising a number of algal particles in a concentration range of about 350,000 to about 750,000 cells per liter, e.g., ~400,000, 450,000, 500,000, 550,000, 600,000, etc., may be spread over each 1000 square meters of cloud area.

By using the dried form of the vaccine an equivalent effect can be achieved. The RCV to be inoculated can be reduced to approximately 33 grams mass giving 219 million cells over an area of 1000 square metres. This is based upon the dried extract having 666,666 active algal units/gram.

Secondary Effects

Oxygen—A By-Product of Assimilation of $CO_2$ During Photosynthesis Affects Earth's Climate Models of past eras show that oxygen ($O_2$) can influence global temperature and humidity as its concentration changes (Article in ANTHROPOCENE A Smithsonian magazine special report by Sarah Zelinski Jun. 11, 2015)

Earth has a surprising new player in the climate game: $O_2$. Even though $O_2$ is not a heat-trapping greenhouse gas, its concentration in our atmosphere can affect how much sunlight reaches the ground, and new models suggest that that effect has altered climate in the past.

$O_2$ currently makes up about 21% of the gases in the planet's atmosphere, but that level hasn't been steady over Earth's history. For the first couple billion years, there was little $O_2$ in the atmosphere. Then, about 2.5 billion years ago, $O_2$ started getting added to the atmosphere by photosynthetic cyanobacteria. "Oxygen is produced as a waste product of photosynthesis. It is consumed through respiration," explains University of Michigan climate scientist Chris Poulsen, lead author of the study published in science.

That $O_2$ waste product sparked a mass extinction known as the Great Oxygenation Event. But over time, new forms of life evolved that used or expelled $O_2$ in respiration, and atmospheric $O_2$ levels continued to increase. "The production and burial of plant matter over long periods causes $O_2$ levels to rise," explains Poulsen. Levels can fall again when that trapped ancient organic matter becomes exposed on land, and elements such as iron react with $O_2$ from the atmosphere, a reaction called oxidative weathering. As a result of these processes, atmospheric $O_2$ levels have varied from a low of 10% to a high of 35% over the last 540 million years or so.

Global Cooling by Releasing Oxygen

Poulsen and his colleagues were studying the climate and plants of the late Paleozoic, and during a meeting they started talking about whether $O_2$ levels might somehow have affected climate in the past. Studies have shown that atmospheric $CO_2$ has been the main climate driver through deep time, so most thought $O_2$'s role has been negligible.

But computer models based on carbon data have not been able to explain everything in the record. For example, the Cenomanian, an age in the late Cretaceous, was marked by high $CO_2$ and soaring temperatures, but models of this time usually spit out polar temperatures and precipitation rates that are too low when compared with data taken from the paleogeologic record. So Poulsen began modifying a climate model to test the $O_2$ idea, and the results showed that changes in $O_2$ concentration did indeed have an impact through a series of feedbacks.

"Reducing oxygen levels thins the atmosphere, allowing more sunlight to reach Earth's surface," explains Poulsen. More sunlight lets more moisture evaporate from the planet's surface, which increases humidity. Because water vapor is a greenhouse gas, more heat gets trapped near Earth's surface, and temperatures rise. The increased humidity and temperature also lead to increases in precipitation. By contrast, when $O_2$ concentrations are higher, the atmosphere gets thicker and scatters more sunlight. As a result, there is less water vapor to trap heat.

A request to Chris Poulsen from RubisCO limited a scientist said that a reduction of 200 Gt of $CO_2$ per annum would cause drastic cooling that would swamp the relatively small increases in $O_2$. Oxygen whilst not being a greenhouse gas contributes to decreasing temperature as it decreases water vapor which is the MAJOR GHG contributor to global warming.

Whereas rainforests get most of the credit for $O_2$ production, microscopic algae produce at least 50% of the Earth's $O_2$. Most methods of Direct Air Capture involve sequestering $CO_2$, e.g., within minerals etc., which serve to remove and long term sequestrate both the carbon and its originating combined life giving $O_2$ from the atmosphere.

Atmospheric "Dust"

Darwin described the falling of fine dust particles from the sails of his vessel on many occasions while cruising in the Atlantic Ocean. He reported that the particles contained dry "infusoria" which included siliceous shells of many freshwater species and a least one marine diatom identified using microscopes available at that time1. Although he did not attempt to grow microalgae from the dust collections, it is now well known that viable microalgae occur in the atmosphere2-5. In a historical survey of airborne microalgae, van Overeem collected green microalgae in northern Europe using an airplane at various altitudes3. These cells were cultivated, and nine algal isolates were identified. In the US, airborne microalgal cells were isolated in many states using car and airplane in a study conducted by Brown et al.2. These isolates were classified into 38 and 17 genera of Chlorophyta and Chrysophyta, respectively, in addition to seven genera of cyanobacteria. More recently, airborne algae were surveyed in Hawaii, and the results of this investigation showed that these algae were dominated by cyanobacteria, followed by green algae and diatoms (ncbi.nlm.nih.gov/pmc/articles/PMC7438330/#CR8). A comprehensive review of the history of airborne microalgae studies is provided by Sharma et al. (ncbi.nlm.nih.gov/pmc/articles/PMC7438330/#CR4).

Most studies on airborne microalgae have been focused on their diversity and abundance in various regions and at different altitudes, as well as the effects of these airborne cells on human health, such allergenicity and toxicity4,7. How they resist environmental stresses in the air has rarely been discussed8. (ncbi. nlm.nih.gov/pmc/articles/PMC7438330/).

Cloud Condensation Nuclei Droplet Formation

Cloud condensation nuclei (CCN) play a crucial role in the formation of cloud droplets. These particles interact with cloud droplets through a process called nucleation, which can be described in two main stages: activation and condensation.

1. Activation:
   Contact and Uptake: When the relative humidity in the air is high enough and exceeds a critical threshold (known as the saturation point), the water vapor in the air begins to condense onto surfaces of CCN particles. This initial condensation is the beginning of cloud droplet formation.
   Growth: As water vapor continues to condense onto the CCN surface, the droplet grows in size. The process of growing cloud droplets from activated CCN is called nucleation. CCN serve as the nuclei for the formation of these small cloud droplets.
2. Condensation:
   Further Growth: Once a cloud droplet has formed around a CCN, it can continue to grow as it accumulates water vapor. This growth is known as condensation.
   Coalescence: Cloud droplets can also collide and coalesce with one another. When they merge, they form larger droplets. This process can continue until the droplets become large enough to overcome air resistance and fall as precipitation.

The effectiveness of CCN in generating cloud droplets depends on several factors, including the size and composition of the CCN, as well as the environmental conditions such as temperature and humidity. Smaller CCN with high surface area-to-mass ratios are more efficient at promoting cloud droplet formation.

The interactions between CCN and cloud droplets are fundamental to cloud physics and meteorology because they influence cloud properties, such as cloud droplet size distribution and cloud brightness (albedo), which, in turn, affect weather patterns and climate.

Mixing with Clouds: While clouds and dust particles are separate entities, they can interact. Dust particles can be lofted into the atmosphere by wind and might encounter clouds. Clouds may form or dissipate based on local weather conditions. Dust particles might scatter light or affect the cloud's appearance, but they are not an integral part of the cloud structure.

So, while dust and sand particles can be carried across large distances by the wind, they do not "stay within the same cloud" in the way that water droplets or ice crystals do. Instead, they are transported by the movement of air masses and wind patterns in the atmosphere. The RCV particles will be naturally attracted to water particles by their electrostatic and hydrophilic properties and carried and dispersed accordingly dependent upon the type and altitude of the cloud, internal convection current, temperature, humidity and wind speed.

Water droplets within a cloud or storm system can be transported over oceans, the specific droplets do not stay within a single cloud or storm system for extended periods due to the dynamic and ever-changing nature of the atmosphere.

The amount of $CO_2$ extracted from the atmosphere will depend upon how long the inoculated drop can remain in the weather system and how much UV light energy is absorbed as well as the temperature, humidity and other physical factors.

Seeding Potential

Biogenic aerosol source of Cirrus Ice Nucleating Particles (Wolf 2020 doi.org/10.1038/s41467-020-18424-6) demonstrates the potential for biogenic Secondary Organic Aerosol to activate as depositional INPs (Ice Nucleating Particles) in the upper troposphere by combining field measurements with laboratory experiments. "This paper tells us how particles in the atmosphere, whether from natural or human-made sources, can impact clouds in a way that we previously didn't understand." Scientists knew that particles in the air from smoke and auto emissions would influence the creation of clouds, but this new research spotlights the importance of volatile emissions from plants and organic material, which the scientists call "secondary organic aerosols." (Czisczo 2020)

In an article in August 2019 Albert Eisenstadt, American Geophysical Union finds Arctic Ocean currents and storms are moving bacteria from ocean algae blooms into the atmosphere where the particles help clouds form. These particles, which are biological in origin, can affect weather patterns throughout the world, according to the new study in the AGU journal *Geophysical Research Letters*. "These special types of aerosols can actually 'seed' clouds, kind of similar to how a seed would grow a plant. Some of these seeds are efficient at forming cloud ice crystals," said Jessie Creamean, an atmospheric scientist at Colorado State University in Fort Collins, Colorado, and lead author on the new study.

Pure water droplets in clouds don't freeze until roughly −40° C. (−40° F.). They are supercooled below their freezing point but still liquid. Aerosols raise the base freezing temperature in supercooled clouds to −5° Celsius (23° F.), by providing a surface for water to crystallize on, and creating clouds mixed with supercooled droplets and ice crystals. Mixed clouds are the most common type of clouds on the planet and the best for producing rain or snow "Cloud seeds", like the bacteria found in algae blooms, can create more clouds with varying amounts of ice and water. An increase in clouds can affect how much heat is trapped in the atmosphere, which can influence climate. The clouds' compositions can affect the Arctic's water cycle, changing the amount of rain and snow that is produced. Increasing the number of clouds and changing the composition of Arctic clouds also affects northern weather systems, potentially affecting weather trends worldwide, the authors of the new study said.

Without ice nucleating particles, precipitation from clouds is less likely to happen, Heike Wex, an atmospheric scientist at the Leibniz Institute for Tropospheric Research in Leipzig, Germany, unaffiliated with the new study explained.

A dried granular particle form of the vaccine size with a range less than 1 micron and a mass of ~$2.4 \times 10$-7 g (0.24 micrograms) is in line with the typical size and mass to serve as effective cloud condensation nuclei (CCN) for cloud droplet formation in atmospheric clouds as follows:

1. Size: A size of less than 1 micron is within the ideal range for CCN. Smaller particles provide a larger surface area relative to their mass, which is crucial for water vapour to condense onto.
2. Mass: The mass is relatively low for a particle of this size. Lighter particles are less likely to fall out of the cloud under the influence of gravity and can remain suspended in the cloud, facilitating the condensation of water vapor into cloud droplets.
3. Environmental Conditions: In the presence of suitable environmental conditions, such as high humidity and updrafts within a cloud, a particle of this size and mass can effectively act as a CCN. Water vapour will condense onto it, forming cloud droplets.

The natural unicellular algae (non-dried) typically have a cell size of less than 10 micrometres which is also below the marginal size for CCN formation.

Therefore, if the vaccine is deployed in its raw cellular form or as dry processed particles they fall into the range for effective CCN for cloud formation as commonly found in atmospheric clouds.

These particles play a crucial role in the formation of cloud droplets and the subsequent processes that lead to precipitation.

Di Methyl Sulphide in Cloud Formation

Prof Andrew Johnston (2007) and his team at UEA isolated a microbe from the mud at Stiffkey saltmarsh to identify and extract the single gene responsible for the emission of the strong-smelling gas, dimethyl sulphide ($(CH_3)_2S$, DMS).

"On bracing childhood visits to the seaside, we were always told to 'breathe in that ozone, it's good for you'," said Prof Johnston. "But we were misled, twice over. Firstly, because that distinctive smell is not ozone, it is dimethyl sulphide. And secondly, because inhaling it is not necessarily good for you."

DMS is a little known but important gas. Across the world's oceans, seas and coasts, tens of millions of tonnes of it are released by microbes that live near plankton and marine plants, including seaweeds and some salt-marsh plants. The gas plays an important role in the formation of cloud cover over the oceans, with major effects on climate. Indeed, the phenomenon was used by James Lovelock as a plank to underpin his 'Gaia hypothesis'.

Electrostatic Attraction

Clouds naturally contain electrostatic charges. Tsutomu Takahashi and Kenji Isono 1968. In Shower type cloud positive electric charges were present in the lower part of clouds and negative electric charge in the upper part of cloud. In continuous rain type cloud, the electric charge distribution of positive and negative charge with height was the inverse of that described above for the shower type cloud.

Electrophoresis is the field-induced motion of a particle with respect to the fluid. Algae have a net negative charge that helps keep them separated. This method is one of many used in "de-watering" algal cultures {repositories.lib.utex-as.edu/bitstream/handle/2152/30754/PR 512.pdf). Most microalgae have negatively charged surfaces (Molina Grima et al. 2003) and thus they can attract, through electrostatic interactions, positively charged ions available in the surrounding solution.

Scientists at Reading University lead by Dr. Keri Nicholl as part of the UAE Rain Development Programme have developed special drones that can fire an electric charge into clouds to make them rain, potentially paving the way for downpours in the Gulf region (www.youtube.com/watch?v=mgemnLewwKI).

John Whittaker, Founder of Rubisco concludes that microalgae can be deposited in the troposphere to enhance cloud seeding. John Whittaker concludes that optimal conditions exist for the growth of microalgae and hence capture of $CO_2$ at large scale in clouds.

Balloon Monitoring and Release Methods
1. Single Balloon technique using a simple automatic valve system to release helium from the balloon at a preset ambient pressure. Automatic valve technique also used for water vapor soundings with frost point hygrometers.
2. Double balloon technique using a carrier balloon to lift the payload and a parachute balloon to control the descent of the instruments after the carrier balloon is burst at altitude. Re-deployed to measure radiation and temperature profiles as it has less of a pendulum effect on the radiation instruments during ascent.

Controlled weather balloon ascents and descents are technically feasible and are advantageous primarily for atmospheric research and climate monitoring because they greatly reduce the potential of measurement contamination by the balloon and flight train, especially for measurements of temperature and water vapor in the UTLS. Controlled descent is also helpful for the proper filling of AirCore with whole air samples that are later analyzed to determine vertical profiles of atmospheric gases (Karion et al., 2010).

Intelligent Balloon Release Unit

The Intelligent Balloon Release Unit (IBRU) is housed in a rectangular Styrofoam box mounted on the horizontal triangle edge between the attachment rings of the two balloons. The IBRU system is based on a microcontroller that controls the GPS and the release mechanism for the carrier balloon. The tether string of the carrier balloon is attached to a bolt inside the release mechanism. In front of the bolt a tungsten wire is wrapped around the string. The hot wire which burns the tether string reaches temperatures of over 1000° C. (red-hot). At the preset GPS altitude the IBRU burns the string, releasing the carrier balloon. Depending on how far apart the two balloons are, the carrier balloon release can be quite rough for the parachute balloon. Preferably they are only 2 to 3 m apart from each other. The initial descent velocity can reach up to 10 $ms^{-1}$ but within a few seconds it slows down to the desired speed. At a descent altitude of 3000 ma.s.l. the IBRU switches on a mobile phone, finds a network and starts transmitting its coordinates via text message at regular intervals until the payload reaches the ground.

Aerosonde

The Aerosonde is an inexpensive, long-endurance unmanned aerial vehicle (UAV) that is an ideal platform for conducting weather observations and scientific research in hurricanes or in Antarctica. With endurance of over 30 hours, a single Aerosonde can obtain observations in regions that are inaccessible without expensive ships or manned aircraft. Because of the low cost of the Aerosonde, it can fly in regions that are deemed too dangerous for manned aircraft (such as at low levels under high-wind conditions). Or the device can be used simply for low-cost monitoring and/or dispensing Strategic choices of "inoculation" sites and predictable air stream duration and direction are suggested in order to control effective deployment for distribution.

Daily Weather Balloon Info & Launches:

Twice a day, every day of the year, weather balloons are released simultaneously from almost 900 locations worldwide! The balloon flights last for around 2 hours, can drift as far as 125 miles away, and rise to over 100,000 ft.

The Met Office launches over 4300 balloons every year from 6 locations across the UK and is involved in launching thousands more around the globe. These are not party balloons; they are weather balloons that take a small weather observation device, called a radiosonde, up through the atmosphere to the very edges of space.

These observations can serve as accessory applications that monitor, prove, and document efficacy of the specific applications of the invention at a specific targeted site or across multiple sites. Such monitoring may be included in a system of payment for licensed use of the patented technologies.

The Rubisco Climate Vaccine® (RCV)

The preferred RCV is a cocktail of selected cultured extremophile psychrophile microorganisms specific for optimal growth and hence carbon capture in the ambient conditions. The RCV is cultured to a specific concentration density for distribution. The RCV contains inorganic trace nutrients as growth accelerants. The RCV contains inert light absorbing particles as accelerant growth nuclei. The RCV can be transported and stored in diluted or concentrated form for long periods in cool light proof containers. The RCV origin cultured phials/agar slopes should be refrigerated at a temperature below 4° C. These storage conditions will minimize potential biomass degradation for mid to long term storage.

The RCV of the present invention is formed as a cocktail of selected cultured psychrophile microorganisms that are serially cultured and combined for optimal growth and hence carbon capture in the target ambient conditions encountered in clouds. As the cultured cocktail "grows' each element becomes larger and produces progeny. The progeny continues to consume $CO_2$ and to grow and proliferate compounding offspring. During the production phase, the RCV is cultured to a desired concentration density for distribution at the target site. In addition to the cultured psychrophile microorganisms, the RCV comprises inorganic trace nutrients as growth accelerants Inert light absorbing particles are included as accelerant growth nuclei The RCV can be transported and can be stored in a diluted or as a concentrated form for long periods in cool light proof containers. Absent light, the cultures maintain dormancy, but are activated when dispersed and exposed to light. Optimally, the RCV is refrigerated at a temperature below 4° C. to minimize potential biomass degradation in mid to long term storage The cultured cocktail for atmospheric or industrial $CO_2$ removal is dispensed as a bio sustainable microalgae cocktail to capture carbon dioxide directly from its ambient gas. Inorganic accelerators in the RCV increase the absorption of specific light wavelengths to increase growth. Accelerant nutrients are included in the vaccine to optimize growth/reproduction.

The naturally occurring wild type of the microorganism species used as source material for the vaccine, flourish and capture carbon dioxide in large amounts where they grow. This invention culturally modifies wild type organisms for optimal activity at the target site where RCV is administered as a growth optimized cocktail directly at the site in quantities for accelerated carbon capture.

The RCV is superior to other Carbon Capture alternatives yet is proposed for use in conjunction with many similarly purposed activities.

The RCV works faster than any known nature-based alternatives. In natural occurring conditions it has been shown to assimilate 65% of irradiated $^{14}C$ carbon dioxide in just three hours. It exceeds known nature-based alternatives for capturing large scale amounts of carbon dioxide directly from the atmosphere. Active constituent organisms of the vaccine have been measured as capturing 40 times more carbon than an Amazonian rain forest per square meter. The growing algae in active culture can withstand high levels of UV radiation (sunlight) as well as intense daily changes in temperature (−20° C. to +20° C.). The cultured organisms can withstand low and high levels of humidity and atmospheric pressure, including water immersion in a concentrated vaccine supply. The vaccine elements are photosynthetically active at temperatures between 0-2° C. on an aqueous ice surface. $CO_2$ assimilation rates increase with increased levels of $CO_2$ up to at least 12 ppm levels. This far exceeds current $CO_2$ in the environment (4 ppm) so even if $CO_2$ levels massively rise, the RCV will remain effective. As the vaccine consumes and sequesters carbon from the $CO_2$ it returns free gaseous oxygen ($O_2$) to the atmosphere from previously combined oxygen in $CO_2$ rather than alternative sequestration methods, such as carbonate deposition.

The Rubisco environmental vaccination is more efficient and less intrusive than other recognized nature-based solutions for climate change, e.g., re-forestation.

The potential available area for growth and replication of extremophile microalgae in a cloud is magnified by over 100-fold over its equivalent ground surface area cover. This enables potential capture of CO2 at Megaton plus levels per individual inoculation of RCV (dependent upon inoculant concentration, coverage, cloud type and physical conditions).

While the inventor used the term "we" in describing this invention, it is to be understood that the inventor conceived the claimed inventions. The inventor directed associates in practicing the processes described herein. Associates also confirmed as "second eyes" reported observations.

The invention claimed is:

1. A passenger or cargo aircraft, or drone comprising a storage tank and a spray dispenser, said storage tank containing a culture of psychrophile algae serially cultured to remove $CO_2$ from ambient air at temperatures less than 4° C.

2. The passenger or cargo aircraft, or drone of claim 1 wherein said storage tank contains a liquid culture.

3. The passenger or cargo aircraft, or drone of claim 1 wherein said storage tank contains a solid powder culture.

4. A method comprising:
placing inoculant, comprising psychrophile algae adapted to remove $CO_2$ from ambient air in a container accessible by a spray device capable of delivering said inoculant to tropospheric clouds; and
delivering said inoculant to an area of said tropospheric clouds.

5. The method of claim 4 wherein said inoculant post-inoculation converts carbon dioxide from said ambient air to biomass by photosynthesis.

6. The method of claim 5 wherein said converting occurs directly in the troposphere.

7. The method of claim 5 wherein said converting releases oxygen directly back into the atmosphere.

8. The method of claim 4 wherein said delivering results in dispersing about $1.2 \times 10^7$ to about $3 \times 10^7$ cells from said culture of said psychrophile algae over a tropospheric cloud area about 1000 square meters.

9. The passenger or cargo aircraft, or drone of claim 1, wherein said psychrophile algae is selected from the group consisting of: *Chlainomonas kolii, Chlainomonas rubra, Chlamydomonas nivalis, Chloromonas pichinchae, Chloromonas* sp., *Raphidonema tatrae, Chromulina chionophila*, and *Cryptomonas frigoris*.

10. The passenger or cargo aircraft, or drone, of claim 9, wherein said psychrophile algae is selected from the group consisting of: *Chloromonas pichinchae, Chloromonas* sp., *Raphidonema tatrae, Chromulina chionophila*, and *Cryptomonas frigoris*.

11. The passenger or cargo aircraft, or drone of claim 1, wherein said psychrophile algae is selected from the group consisting of: naturally occurring wild type psychrophile algae.

12. The passenger or cargo aircraft, or drone of claim 2, wherein said liquid culture comprises about $5 \times 10^5$ algal organisms/liter.

13. The passenger or cargo aircraft, or drone of claim 1, wherein said psychrophile algae is selected from the group consisting of: non-cyanobacteria microorganisms.

14. The method of claim 4, wherein, said inoculant is a solid powder.

15. The method of claim 4, wherein, said inoculant is in liquid culture.

16. The method of claim 15 wherein liquid culture contains approximately $5 \times 10^5$ algal organisms per liter.

17. The method of claim 15 wherein upon said delivering said liquid culture contains between about 350,000 and 750,000 cells per liter.

18. The method of claim 4, wherein, said psychrophile algae is selected from the group consisting of: *Chlainomonas kolii, Chlainomonas rubra, Chlamydomonas nivalis, Chloromonas pichinchae, Chloromonas* sp., *Raphidonema tatrae, Chromulina chionophila*, and *Cryptomonas frigoris*.

19. The method of claim 18, wherein, said psychrophile algae is selected from the group consisting of: *Chloromonas pichinchae, Chloromonas* sp., *Raphidonema tatrae, Chromulina chionophila*, and *Cryptomonas frigoris*.

20. The method of claim 4, wherein said delivering results in dispersing up to about 219 million cells per 1000 square meters.

* * * * *